J. RILEY & R. D. HUNT.
SHOCK ABSORBER FOR VEHICLES.
APPLICATION FILED OCT. 18, 1909.
959,170.
Patented May 24, 1910.
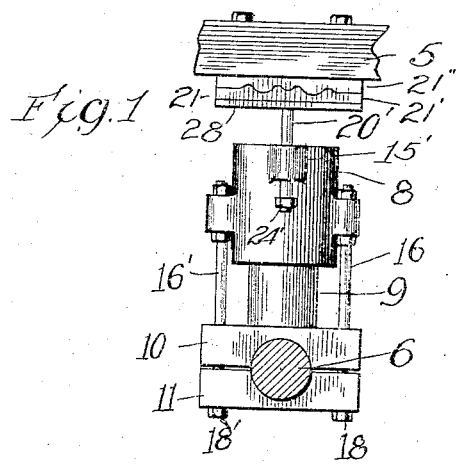
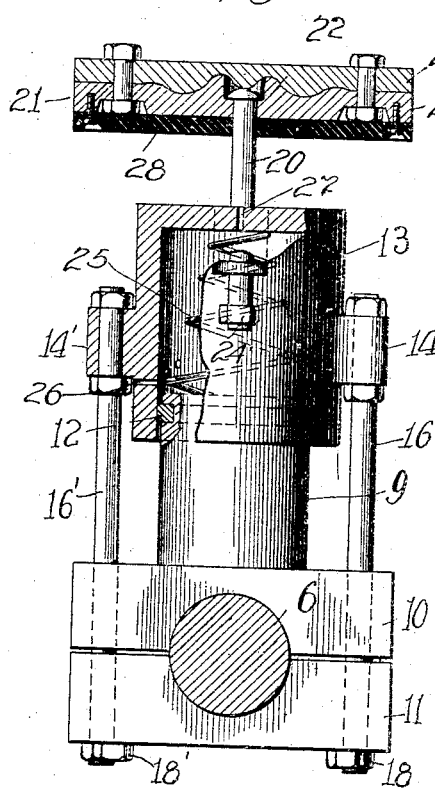
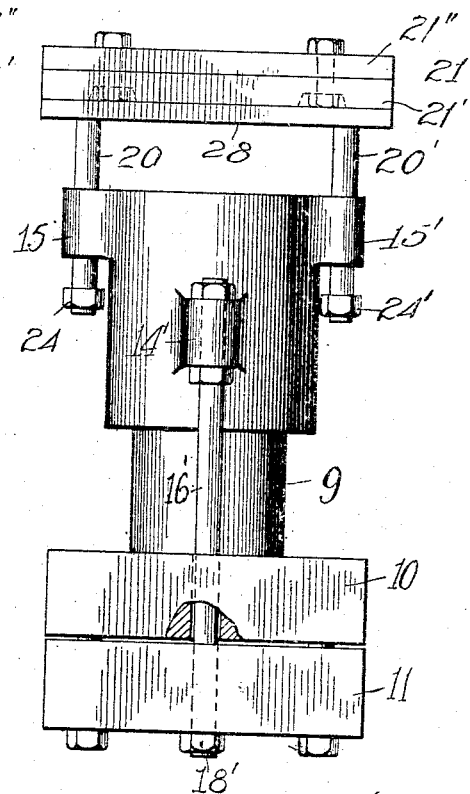
Witnesses:
H. P. L. White
R. A. White
Inventors:
John Riley and
Randall D. Hunt
By Foree Bain & May Attys.

UNITED STATES PATENT OFFICE.

JOHN RILEY AND RANDALL D. HUNT, OF LAPORTE, INDIANA.

SHOCK-ABSORBER FOR VEHICLES.

959,170. Specification of Letters Patent. Patented May 24, 1910.

Application filed October 18, 1909. Serial No. 523,266.

*To all whom it may concern:*

Be it known that we, JOHN RILEY and RANDALL D. HUNT, citizens of the United States, both residing at Laporte, in the county of Laporte and State of Indiana, have invented certain new and useful Improvements in Shock-Absorbers for Vehicles, of which the following is a specification.

Our invention relates to improvements in shock absorbers for vehicles and the like, and has for its general object to provide a pneumatic shock absorber susceptible of easy and cheap manufacture which will operate efficiently to permit relatively free movement between the parts of the vehicle which it connects during the initial range of movement, and to interpose a pneumatic cushion or check to maintain the vehicle parts separated under the longer movement incident to severe shocks.

In the drawings, Figure 1 is a side elevation of our shock absorber applied to fragmentary parts of an automobile; Fig. 2 is an enlarged side elevation with parts broken away of the shock absorber; and Fig. 3 is a similar front elevation thereof.

In the drawings, 5 indicates in general a portion of an automobile frame and 6 an axle thereof, such parts being typical of a running gear part and a part moving with the frame, as relatively movable parts to be connected.

8 indicates in general the shock absorber interposed between the vehicle parts, typified by the frame 5 and the axle 6. The shock absorber comprises in general a stationary piston, 9, connected to one of said vehicle parts, herein shown as the axle 6, said piston in the construction shown being a projection from the base plate, 10, secured in conjunction with the clamping member, 11, to the axle, so as to stand in vertical position confronting the superposed frame or other part moving with the body. The piston is provided with customary packing rings, 12, or the like, so as to interfit closely with a movable cylinder member, 13, said cylinder being arranged to float or move readily with respect to both the frame member and the running gear member within limits prescribed by the parts. For effecting suitable guiding and limiting connections for the cylinder, we provide upon its exterior surface guiding lugs, 14—14', and 15—15', vertically apertured, the first mentioned lugs, 14—14', having rigidly attached thereto rods, 16—16', projecting through guiding apertures 17 in the base structure. At their lower ends, the rods bear respectively adjustable nuts, 18—18', whereby the upward movement of the cylinder with respect to the base may be limited.

The lugs 15 and 15' slidingly engage hanger bolts, 20 and 20', secured in a bracket, generally indicated at 21, connected to the frame part, and preferably made up of two pieces, 21' and 21'', the lower member, 21', being apertured, as at 22, to receive the heads of the stems, 20—20'. The rods 20—20' preferably stand so as to extend below the lugs 15—15' and are provided with adjustable stops, 24—24', on their lower ends.

Preferably, a spring, 25, is interposed between the stationary piston 9 and the head of the cylinder 13, so as to maintain the parts normally at their most open position, or with the cylinder at the end of its outstroke. A series of apertures, 26, is preferably formed in spiral arrangement or at different vertical positions around the side of the cylinder at its remote end from its head which we will term its "outer end," while at the inner or head end one or more vent apertures, 27, are provided, the latter being arranged for closure by a valve acting to close the vent only when the bracket has moved to its limit toward the cylinder. To this end, a rubber cushion valve, 28, is secured to the bottom of bracket 21 for presentation to the vented top of the cylinder.

In operation, it will be understood that the frame member 5 and running gear member 6 have a certain latitude of movement toward and from each other without in any way affecting the relation of the cylinder and piston as the frame member may move until the cushion valve 28 on brackets 21 strikes the end of the cylinder 13 without imparting movement to the cylinder, the rods 20 and 20' merely sliding through their receiving lugs, 15 and 15'. When the valve 28 impinges the cylinder end, however, the cylinder is forced forward and tends to force air out through the openings 26 and to some extent through the openings 27, so permitting further movement of the frame member and running gear with relatively slight resistance until the last of the apertures 26 is past and the pressure upon the cushioning valve 28 compresses it so firmly against the aperture 27 so to close the latter, thereby confining within the cylinder a body of air which acts as a cushion tending to prevent further approach of the running gear and frame members. When the running gear and frame members move back toward initial position the action is reversed, the valve 28 opening the vent 27, and the ports 26 also opening to restore the atmospheric pressure conditions within the cylinder.

While we have herein described in some detail a particular embodiment of our invention, it will be apparent to those skilled in the art that numerous changes might be made in the details of the construction without departure from the spirit and scope of the invention and within the scope of the appended claims.

What we claim is:

1. In a shock absorber the combination of a piston member and a cylinder member, relatively movable and adapted for attachment with coacting relatively movable parts of a vehicle or the like, the movable one of said members being provided with a small vent opening, and a resilient cushioning valve exteriorly overlying said vent opening, and normally out of contact therewith.

2. In a shock absorber, the combination of a relatively stationary piston, a relatively movable cylinder having a small vent aperture in its head, a cushioning valve overlying said vent opening and out of contact therewith, and a part arranged for movement toward and from the cylinder to force the valve into closing position.

3. In a vehicle shock absorber, the combination of a relatively stationary piston, a base therefor, a cylinder mounted for reciprocation on said piston, having a vent in its end; a cushioning valve part overlying said aperture and normally out of contact with it; a bracket beyond said cushioning valve arranged for connection with a relatively movable vehicle part to move toward and from said cylinder; and guiding connections between said bracket and the cylinder, whereby the bracket by its downward movement may force the valve into vent-closing position on the cylinder and then force the cylinder in on the piston.

4. In a device of the character described, the combination of a base, a bracket separated therefrom, a piston on the base, a cylinder movable on the piston and having an end vent, guiding means connecting said cylinder with the base and piston for limited movement, guiding means connecting said cylinder with the bracket for limited movement, a spring interposed between said piston and cylinder, a resilient cushioning valve overlying the vent in the end of the cylinder and associated with the bracket to be moved thereby into position to close the vent.

In testimony whereof we hereunto set our hands.

JOHN RILEY.
RANDALL D. HUNT.

In the presence of—
PAUL HILGENDORF,
M. ANDRESEN.